J. D. COOPER.
APPARATUS FOR EXTERMINATING BOLL WEEVILS AND THE LIKE.
APPLICATION FILED DEC. 11, 1915.
1,188,736.
Patented June 27, 1916.
2 SHEETS—SHEET 1.
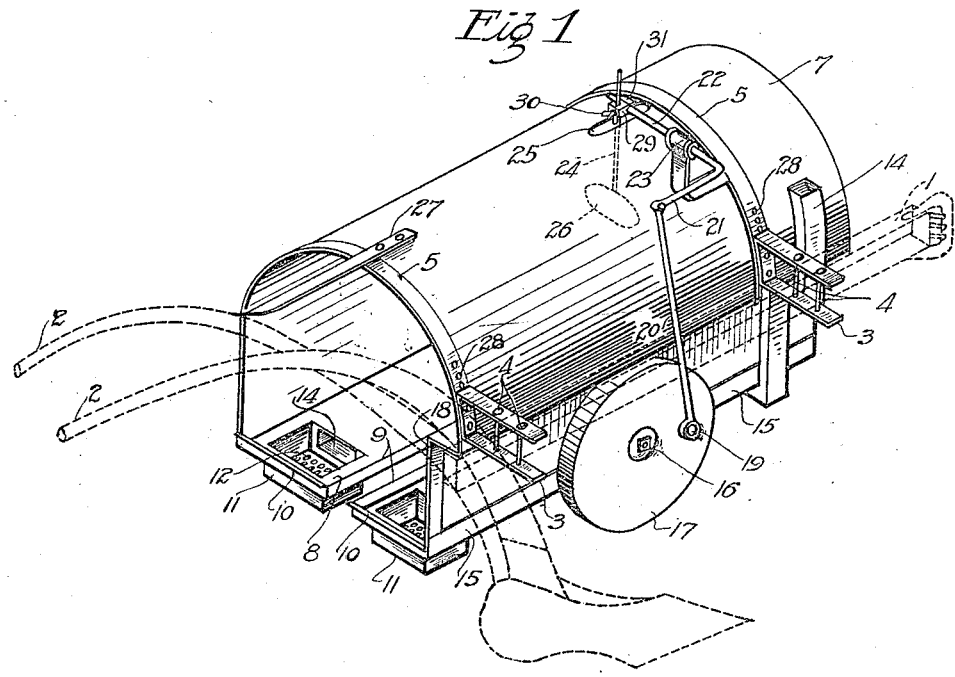
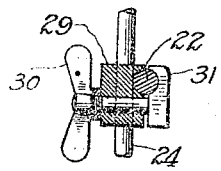
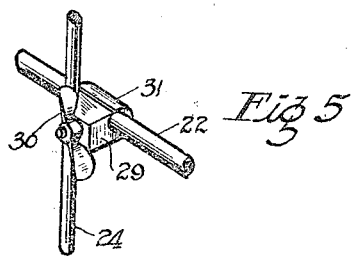
Inventor
John D. Cooper

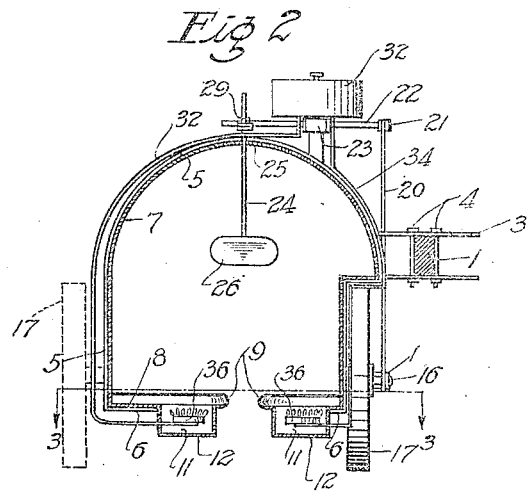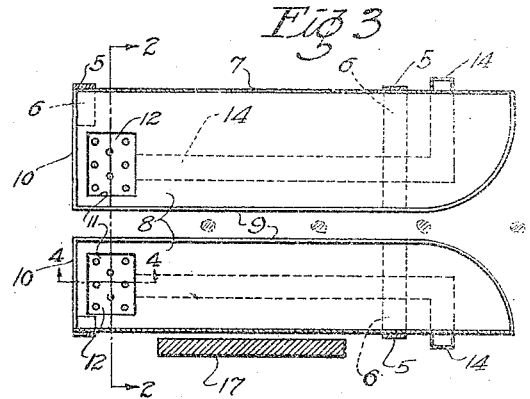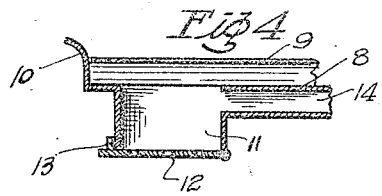

UNITED STATES PATENT OFFICE.

JOHN D. COOPER, OF JEMISON, ALABAMA

APPARATUS FOR EXTERMINATING BOLL-WEEVILS AND THE LIKE.

1,188,736.

Specification of Letters Patent.

Patented June 27, 1916.

Application filed December 11, 1915. Serial No. 66,373.

*To all whom it may concern:*

Be it known that I, JOHN D. COOPER, a citizen of the United States of America, residing at Jemison, in the county of Chilton and State of Alabama, have invented certain new and useful Improvements in Apparatus for Exterminating Boll-Weevils and the like, of which the following is a specification.

My invention relates to an apparatus for catching and killing boll weevils, potato bugs and like insects which infest and destroy growing plants.

Apparatus of various kinds has been devised for the purpose of catching and destroying boll weevils, but it has proven too expensive and cumbersome to be practically available for use in the field.

The prime object of my invention is to design an apparatus which is so small, light and compact in its nature that it can be cheaply produced, easily handled, and what is of the greatest importance, can be readily attached to farming implements such as plows and cultivators so that it may be operated through the field without increased cost.

I consider the most important feature of my invention to relate to the designing of a device which may be attached to a cultivating implement and to this end I have designed a light sheet metal frame which is U-shaped in cross section and adjustably attached at one side to the cultivating implement in position to travel over a row of plants and having inturned bottom flanges which are spaced so as to travel close to the stalks of the plants beneath the limbs so that they will catch the insects or the punctured squares which are shaken or knocked from the plants by the passage of the device over them, the apparatus preferably having a knocking means which will shake the plants and cause the fall of the insects and punctured squares onto the base flanges. In order to complete the operation of exterminating the insect, each of these flanges is provided with a burner or fire pot into which the insects and punctured bolls are swept by the dragging of the limbs and leaves.

A further feature of my invention relates to the provision of a wheel to form a supplemental support for my apparatus and to actuate the devices which knock or shake the plant. Moreover, this wheel will serve as a wheel support by which my apparatus can be moved when not supported by the cultivating implement.

My invention further comprises the various novel details of construction and arrangements of parts by which it is especially adapted for the purposes described, and which in their preferred embodiment only are hereinafter more particularly described, reference being had to the accompanying dawings, in which:—

Figure 1 is a perspective view of the apparatus shown attached to the beam of a cultivating implement which is in dotted lines for the sake of clearness. Fig. 2 is a vertical sectional view taken on the line 2—2 of Fig. 3, but showing a modified form of means for forming the fire pot by an oil flame. Fig. 3 is a horizontal cross sectional view taken on the line 3—3 of Fig. 2 with the oil burner mechanism omitted. Fig. 4 is a detail sectional view showing the fire pot as used with charcoal or like fuel. Fig. 5 is a detail view of the clamp for adjustably connecting the knocker arm to the crank shaft. Fig. 6 is a partial sectional view through the clamp showing the manner in which it connects the arm and crank shaft.

Similar reference numerals refer to similar parts throughout the drawings.

I have illustrated my invention as attached to the beam 1 of a plow or cultivator, of any well known type, having handles 2. The apparatus for catching the insects is shown attached to the forward end of the beam by means of U-shaped brackets 3 which are provided on their top and bottom legs with rows of alining bolt holes so as to receive bolts 4 on each side of the beam, which bolts clamp the brackets firmly to the beam. These brackets at their closed ends are bolted each to a U-shaped metal strap 5 having its lower ends inturned to form supporting arms 6. Within the straps I mount a casing 7 of light weight sheet metal, preferably galvanized iron, which is bent to form an inverted U-shaped arch having its bottom ends bent inwardly and horizontally to form base flanges 8 which rest upon and are supported by the arms 6 at the base of the straps. The adjacent edges of the flanges 8 are spaced about two inches apart and they are upturned and rolled over at 9 to present a smooth round edge for engaging the stalk of the plant.

Also the forward corner edges of these flanges are cutaway so that the flanges diverge to form a neck which flares forwardly and serves to guide the stalks of the plant into the passage left for them between the flanges 8. The rear ends of the flanges are upturned at 10 to a point substantially above the top level of the flange and are rolled over so that the limbs of the plant will ride freely over them. Immediately in front of each of these rear flanges 10 I provide an opening in the flange 8 and below this opening is mounted a fire pot 11 adapted to receive a charcoal fire or a burner of any suitable type so that when the insects and punctured squares are swept backwardly along the flanges 8, they will fall into the fire pot and be there consumed. The perforated bottom 12 of each fire pot is hinged so that it will drop down for the removal of the ashes and burnt squares and insects. A catch 13 holds each of these bottoms normally in closed position.

A flue 14 leads from each fire pot along under the flanges 8 to the forward ends thereof and then around and up each side of the casing 7 to a point above the level of the beam 1. These flues are intended to carry forward the products of combustion and smoke and to deliver them at a point farthest removed from the operator. The tendency of the smoke to enter and pass through the flues is increased by the fact that the latter, in normal operating position, have an upward inclination as they pass along under the frame. Attached to each of the metal straps 5 are bars 15 which are set downwardly at a slight angle and receive at the point where they overlap a pivot pin 16 for a supporting wheel 17, it being noted that the side of the casing next to the wheel is bent inwardly at 18 sufficiently to overhang the wheel, and thus permit the body of the casing to be brought close to the beam 1. This wheel is a ground wheel and intended to partially support the weight of the apparatus and in addition thereto the wheel carries an eccentric pin 19 which, by means of the connecting rod 20, serves to oscillate the crank 21 on the end of a crank shaft 22. This shaft is mounted in a bearing 23 upon and near the forward end of the casing and at its inner end over the top of the casing it is provided with a depending knocker arm 24 which passes down through a top opening 25 in the casing 7. On the lower end of this arm 24 is provided a fan shaped blade 26 which, as it oscillates up and down through a limited angular play will ride over and brush against the leaves and limbs of the plants sufficiently to dislodge the punctured squares and insects without breaking or injuring the plants.

It will be noted that the outer side of the casing is left free of rigid connection to the beam and since the casing is not itself rigid, its outer base flange 8 will be free to swing toward and from the other base flange 8 and thus yield readily to avoid the probable damage to the stalks of the plant. To partially relieve the rearward thrust strain on the outer side of the casing, I have provided a brace bar 27, extending from the rear top edge of the outer side of the casing back to the rear handle of the plow, and so attached to the casing as to take the thrust without materially restricting the free flexing of the outer casing flange 8.

In order to adapt the apparatus for attachment at different heights, the straps 5 are provided with a plurality of bolt holes 28 so that the brackets 3 can be adjusted up or down along the side of the casing to suit the type of cultivating implement used or to set the apparatus in running position at the desired height above the ground. Since the bracket arms are elongated and have a row of bolt holes therein for the bolts 4, my attachments provide for both lateral and vertical adjustments in connecting the apparatus to the beam 1.

The knocker arm 24 may be adjustably connected to the crank shaft 22 so as to vary its angular position and its length in the casing. This I accomplish by passing the arm through a socket in a clip 29, which socket also receives the rounded crank shaft 22. A thumb nut 30 engages a clamp hook 31 having a threaded shank passing through the clip, the hook end of the shank being adapted to engage the shaft 22 and draw it against the arm to lock both shaft and arm to the clip. I thus adapt one screw to lock the knocker arm in any desired vertical or angular adjustment on the crank shaft.

In operation, the apparatus having been attached to the beam of the plow in the manner already described, and in such position that while cultivating in the ordinary manner, the casing 7 will run centrally over an adjacent row of plants. As the apparatus travels along the row the forward curved ends of the casing flanges 8 will guide the plants into the passageway left between the flanges and as the plants traverse the casing the insects and punctured bolls are knocked down and fall upon the flanges 8. As the flanges 8 travel along under the trailing leaves and lower limbs of the plants, the latter will sweep the insects and punctured squares rearwardly along the flanges until they fall into the fire pots and are destroyed.

Should it be desired to operate the apparatus independently of the plowing operation, it is only necessary to disconnect the plow from the beam 1 and then the apparatus can be either pushed or drawn along on its ground wheel like a wheel barrow, the handles on the plow and the beam serving to guide and control it. A wheel might be provided, as indicated in dotted lines, on both sides of the casing, but this would destroy the free flexibility of the casing and would require the provision of more complicated mechanism to yield and permit the stalks of the plants to pass, and I therefore prefer to utilize the apparatus with only one ground wheel.

I show in Fig. 2 a modification of my invention in so far as the same relates to the means for burning and destroying the insects and the squares. Instead of relying upon an ordinary charcoal or other fire in the fire pots 11, I contemplate the mounting of a well known type of gasolene reservoir 32 upon bearing 23 and conducting the oil therefrom by a pipe 33 through the side of the rear fire pot 11 and providing a branch pipe 34 which stands clear of and passes over the top of the casing and down the other side at a space of an inch or two therefrom and is then inturned at 35 and brought in through an enlarged opening in the outer side edge of the other fire pot. This pipe therefore leaves the casing free to flex. The oil is put under pressure by compressed air in the reservoir 1 and delivered to any well known type of burner 36 on each end of the pipes 32 and 34.

Having thus described my invention, what I claim as new and desire to secure by Letters Patent, is:—

1. In an apparatus of the character described, a frame adapted to straddle a row of plants and having on each side means for catching insects, disposed to travel beneath the limbs on both sides of the stalks of the plants, brackets mounted for vertical adjustment on one side only of the frame, and means for attaching said brackets to the beam of a cultivating implement, said means being laterally adjustable on the beam and adapted to support the frame therefrom with one side of the frame left free to vibrate laterally, substantially as described.

2. In an apparatus of the character described, a substantially U-shaped frame formed of a flexible sheet of bent metal which is inverted and adapted to travel lengthwise over a row of plants and which has substantially horizontal insect catching members disposed to travel under the plant limbs and on each side thereof close to the stalks, and a supporting means attached to one side only of the frame, leaving the other side supported only by the arch of the frame and free to flex.

3. In an insect catching apparatus, an inverted U-shaped casing of light sheet metal having its bottom flanges inturned to form catching shelves, said shelves being spaced to form a passageway between for the stalks of plants; a ground wheel journaled at one side of the casing, means to guide and propel the casing on said wheel, and shaker means projecting downwardly through the top of the casing and having a vibratory operating connection with said ground wheel, substantially as described.

4. In an apparatus of the character described, an inverted U-shaped casing having an inset on one side, a ground wheel journaled to the inset side, reinforcing straps passing from side to side over the casing, metal clips adapted for adjustable attachment to said straps and having means for adjustably attaching them to the beam of a cultivating implement, insect catching shelves carried at the bottom edges of the casing, and means to collect and destroy the insects that fall on said shelves.

5. In an apparatus of the character described, a metal casing adapted to straddle a row of plants, collecting shelves carried at the lower side edges of the casing and inturned to travel under the plant limbs, means to agitate the plants, means for moving the apparatus over the row of plants, a fire pot at the rear end of each shelf, and flues leading from the fire pots under and upwardly on each side of the casing.

6. In an apparatus of the character described, an inverted substantially U-shaped casing formed of a bent sheet of metal and adapted to travel lengthwise over a row of plants, insect catching trays carried by the lower ends of the casing and disposed to travel on each side of the plants and under the limbs thereof, a ground wheel at one side only for supporting the casing, and a knocker means depending through the top of the casing and having its upper end operatively connected to and actuated by the ground wheel and adapted to strike the plants as they pass through the casing, substantially as described.

7. In an apparatus of the character described, an inverted U-shaped sheet metal casing open at its bottom and adapted to straddle a row of plants, insect catching trays at the bottom of the casing and disposed to travel on each side of and close under the limbs of the plants, means to agitate the plants, a fire pot at the rear end of each tray, means to support the casing from one side only, leaving the other free to vibrate laterally, an oil burning apparatus connected to the casing on the side next to said support and having pipes leading to each fire pot, and a burner in each fire pot, the pipe leading to the free side of the casing and its burner being free of rigid connection to the casing.

8. In an apparatus of the character described, a casing open at its bottom and adapted to straddle a row of plants, a supporting means connected to one side only of the casing, insect catching trays at the bottom of the casing and disposed to travel on each side of and close under the limbs of the plants, plant agitating means in the casing, a fire pot at the rear end of said trays, an oil burning apparatus having pipes leading to each fire pot, one of said pipes being passed over the casing free of rigid connection to its free side, a burner in each fire pot, and means to leave the outer side of the casing free to vibrate without engaging said pipes, substantially as described.

In testimony whereof I affix my signature.

JOHN D. COOPER.

Witness:
S. G. CAUTHER,